Patented Mar. 20, 1934

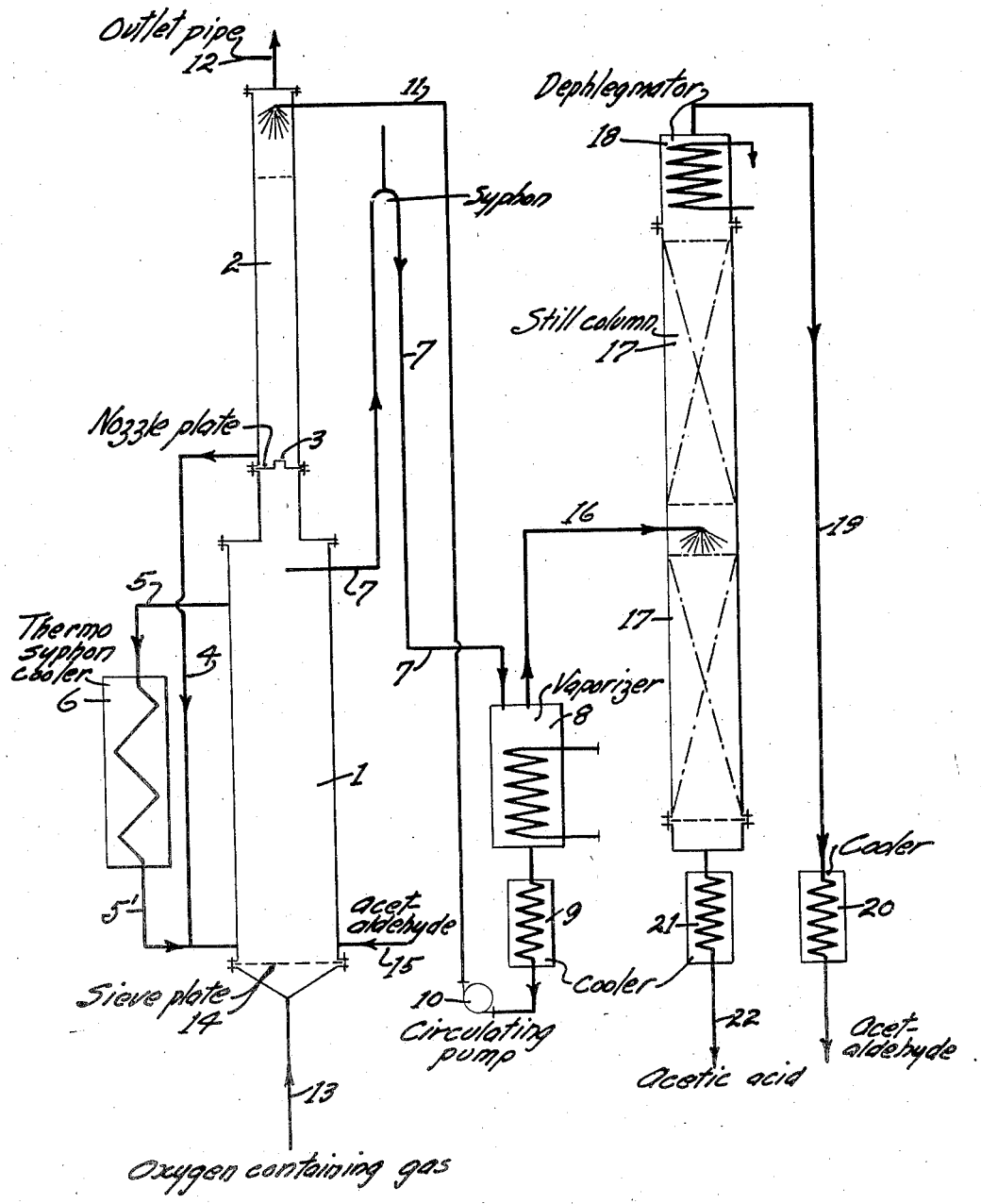

1,951,789

UNITED STATES PATENT OFFICE 1,951,789

PRODUCTION OF ACETIC ACID

Martin Mueller-Cunradi, Kurt Pieroh, and Hellmut Giehne, Ludwigshafen-on-the-Rhine, Germany, assignors to I. G. Farbenindustrie Aktiengesellschaft, Frankfort-on-the-Main, Germany Application September 10, 1932, Serial No. 632,550
In Germany September 16, 1930

8 Claims. (Cl. 260—116)

The present invention relates to the production of acetic acid.

It has already been proposed to prepare acetic acid by oxidizing acetaldehyde by means of oxygen, the reaction being carried out in a vertical tubular vessel containing solid filler bodies which act as diluents and are intended to prevent explosions of the mixture of oxygen with the aldehyde vapours since the oxygen is contacted with the aldehyde only in the spaces left free between the said solid filler bodies. In order to maintain the desired reaction temperature a suitable proportion of acetic acid containing, if desired, one of the catalysts known for the reaction is fed into the cooled upper part of the apparatus, whereas the acetaldehyde is preferably introduced into the middle part of the vessel where it is contacted with a current of oxygen introduced from the bottom of the vessel. The lower part of the vessel is preferably heated so that unaltered aldehyde, eventually present in the mixture of acetic acid introduced and formed, distills off into the reaction space, whereas any peracetic acid formed is decomposed, acetic acid free from aldehyde being thus drawn off from the bottom of the vessel.

Another continuous process for the production of acetic acid by the oxidation of acetaldehyde by means of an oxygen containing gas consists in conducting the reaction in a medium of acetic acid containing a soluble catalyst, which medium is supplied to a tower provided with filler bodies and allowed to flow in countercurrent to a stream of acetaldehyde vapour and oxygen containing gas, the acetic acid being continuously withdrawn at the bottom of the tower and then continuously separated into pure acid and an acid containing the catalyst, which is continuously returned into the process. The amount of pure acetic acid separated is preferably equal to that produced by the oxidation, so that the solution of the catalyst in the acid is maintained at its original concentration. If desired, the reaction may be performed under pressure. In order to localize the oxidation in the middle section of the tower, different sections thereof may be maintained at various predetermined temperatures and a part of the liquid may be withdrawn from the central oxidation section, circulated through a cooler and returned to the tower.

Although the described processes each mark a progress as compared with older, similar or other methods, there is still an important objection thereto, namely the risk of explosion which is due to the impossibility of preventing the accumulation of gaseous mixtures of aldehyde and oxygen within the apparatus. Since such explosions may occur quite suddenly at any time, working according to either of the said processes is rather dangerous and objectionable.

We have now found that the continuous oxidation of acetaldehyde to acetic acid by means of an oxygen containing gas, such as oxygen or air, in the presence of acetic acid, which, preferably carries a catalyst, can be effected in a very advantageous manner while avoiding any risk of explosion and practically any loss of aldehyde while continuously supplying acetic acid to the reaction mixture, and drawing off a quantity of acetic acid corresponding to that formed from the aldehyde, if the oxidation is carried out in a vertical, coherent column of acetic acid, while introducing the oxygen containing gas and acetaldehyde both into the lowest region of said coherent column. The said coherent column of acetic acid preferably comprises more than one zone, the uppermost zone being continuously supplied from its highest region with a stream of cold acetic acid free from acetaldehyde and carrying the catalyst, if such is employed, whereas the liquid from the lowest zone of said coherent column, preferably moves upwards together with the oxygen containing gas and the acetaldehyde, so that any gaseous materials must flow upwards and pass throughout through a whole liquid column in which there may exist no gas spaces other than the bubbles formed by the rising gases or vapours introduced into the lowest zone.

The catalysts which may be employed according to the present process can be chosen from any of those hitherto employed for the reaction such as active carbon or one or more metals, such as manganese, copper, cobalt, nickel, chromium, iron, vanadium, platinum and other metals of the platinum group. The metals may be employed in the form of their salts soluble in acetic acid, especially in the form of their salts with fatty acids, such as formic, acetic, tartaric, propionic, butyric and like acids, or of their salts with inorganic acids, such as hydrochloric, sulphuric or nitric acids, if desired in conjunction with the corresponding salts of alkaline earth metals, that is barium, strontium, and calcium, including magesium and aluminium. Although any of the said salts, or mixtures may be employed as the catalyst, we prefer to employ the acetates and, more particularly, manganese acetate as the essential constituent which has proved to be most efficient. The catalysts are usually employed in a quantity of from about 0.1 to about 0.5 per cent by weight of the acetic acid employed as the liquid reaction medium, preferably in an amount of 0.2 per cent; the quantity of salts of metals other than manganese is generally about 10 per cent by weight of the manganese acetate, if such be employed as the catalyst and if it is desired to employ mixtures.

Cold acetic acid free from aldehyde which is supplied as stated above to the uppermost zone may be obtained for example by continuously withdrawing, preferably near the highest region of the lowest zone (in which the oxidation takes place), a quantity of acetic acid, corresponding to the amount of acetaldehyde which is continuously introduced into the lowest region of said zone and oxidized therein, subjecting the acid withdrawn to distillation, preferably until the vapours are free from unaltered aldehyde, and cooling the residual acid which is then free from aldehyde but still contains the catalyst, if such has been employed, and supplying this cold acid to the upper zone of the liquid column.

The acid which is supplied to the said uppermost zone is cooled to a temperature of from 18° to about 30° C., preferably to about 20° C. Near the lowest region of the uppermost zone the temperature of the acid may be from about 25° to about 40° C. owing to the heat developed by the reaction. This warm acid may be directly supplied to the lowest zone of the coherent liquid column, preferably to a lower region of said zone. As already stated, it is preferable that the lowest zone of the liquid column moves upwards, that is in the same direction as the oxygen containing gas and the acetaldehyde, which latter is preferably supplied in the liquid state. The oxygen containing gas must be introduced of course under a pressure at least corresponding to that of the whole coherent column of acetic acid; it is also possible to introduce the oxygen-containing gas at a still higher pressure for example up to about 6 atmospheres above the pressure of the column of acetic acid. When working with pure, or practically pure, oxygen the lowest pressure which is necessary is generally employed, whereas a corresponding partial pressure of oxygen, and, accordingly, a higher total pressure, is used when air, or air enriched in oxygen, containing, say, 40 per cent of oxygen, is employed.

The temperature of the lowest zone is generally maintained between about 30° and about 100° C., preferably between about 50° and about 70° C. Since the reaction develops a good deal of heat, the desired temperature must be regulated by cooling. This cooling may be effected by means of external cooling jackets or coils arranged round the said zone, or also of cooling devices, such as coils, arranged within the said zone. We prefer, however, to regulate the temperature in the said zone by continuously withdrawing a considerable portion of the liquid reaction mixture from the upper region of the said lowest zone, externally cooling said portion, preferably by a thermosiphon cooler or similar cooling system, and returning the cooled liquid into the lower region of the said zone. This arrangement has the further advantage that the reaction mixture is circulated in the same direction as the oxygen containing gas and the aldehyde whereby a very efficient mixing is obtained. It is very advantageous to effect as quickly as possible this circulation of the reaction mixture.

The oxygen and the aldehyde are usually employed in about equimolecular proportions; it is, however, possible to take a slight excess, say up to 1 or 2 per cent, of either of these substances. The process may be carried out in a tower-shaped, vertical vessel in which means are arranged which are capable of restricting the cross-section in the upper half of said vessel; such means should be arranged at least near the middle of said vessel, so that at least two zones are formed. It is, however, also possible to form more than two zones, by arranging several restricting means, preferably in the upper half of the vessel. In order to introduce the oxygen containing gas and the acetaldehyde, at least two inlet pipes are arranged at or near the bottom of the vessel. An external cooling device, preferably a thermosiphon cooler, is connected to about the upper region of the lower zone formed in the said vessel by the said restricting means and to about the bottom of said vessel, so that the reaction mixture may be quickly circulated upwards through the said lower zone and downwards through the cooling device. At about the bottom of the uppermost zone an outlet pipe is arranged, through which the acetic acid is led downwards to the lower zone to which the said pipe is connected, either directly and preferably at about the bottom of the vessel, or indirectly, by means of the upper pipe of the cooling device, in which case the acid coming from the bottom of the upper zone is mixed with the reaction mixture which is circulated through the said cooling device. An outlet pipe is arranged at the top of the vessel, which pipe is intended for removing gaseous materials; if the process is carried out under increased pressure, i. e. at a pressure of, say, 3 to 6 atmospheres above that of the coherent column of acetic acid, especially when air is employed as the oxygen containing gas, the said pipe is provided with a pressure releasing valve. Below the mouth of the said outlet pipe, an inlet pipe protruding into the top of the vessel is arranged through which pipe the cold acetic acid is supplied to the upper zone of the vessel. A siphon pipe is further provided at the upper region of the lower zone of the vessel the bend of which siphon pipe is slightly below the mouth of said inlet pipe protruding into the top of the vessel. If the process is carried out under the said increased pressure the air pipe of the siphon pipe is led into the head part of the vessel, above the mouth of the inlet pipe protruding into the top of said vessel and below the mouth of the outlet pipe provided with the said pressure releasing valve. The said siphon pipe serves to withdraw acetic acid from the said lower zone and is connected with a vaporizer the bottom of which is connected to a cooler. The top of the vaporizer is connected to a distillation column or tower, for example to about the middle thereof, a dephlegmator being arranged at the top of said tower. The reaction mixture withdrawn from the lower zone of the reaction vessel by means of said siphon pipe is led into the said vaporizer where part of the acid and the whole of the aldehyde are vaporized, the vapours being led into said distillation tower, at the bottom of which the acetic acid is withdrawn through a cooler, whereas the aldehyde vapours escape through the dephlegmator and are returned, after cooling and condensation, into the lower zone of the reaction vessel. Acetic acid free from aldehyde but still containing the whole of the catalyst, if such be employed, is withdrawn from the said vaporizer, cooled in the cooler at the bottom of said vaporizer, and lifted by means of a circulating pump or a similar lifting device, into the said inlet pipe which protrudes into the top of the vessel.

If desired, filler bodies, such as Raschig rings, may be arranged in the upper zone and/or in the lower zone or zones, but the reaction proceeds quite smoothly without filler bodies.

The reaction vessel and the other parts of the apparatus must be constructed with materials which are not attacked by the warm acetic acid; such materials may be metals, for example technically pure aluminium, or special steels, such as chrome nickel steels, or ceramic materials.

The nature of the invention will be further described with reference to the accompanying diagrammatical drawing which illustrates an arrangement of apparatus according to this invention but the invention is not restricted to the particular arrangement shown.

A tubular vessel is composed by two superimposed parts 1 and 2 the latter of which bears at its top and outlet pipe 12. The vessel 1 bears near, or respectively at, its bottom two inlet pipes 13 and 15 and above the inlet 13 a sieve plate 14. A check valve or nozzle plate 3 separates the vessel 1 from the vessel 2 so that two zones are formed. A pipe 4 connects the lowest part of vessel 2 with the lower part of vessel 1. Pipes 5 and 5' connect a thermo-siphon cooler 6 to the upper and lower regions of the vessel 1. The upper region of vessel 1 is connected through a siphon-pipe 7 to a vaporizer 8 the bottom of which latter is connected to a cooler 9. A circulating pump 10 is connected to said cooler 9 and by the pipe 11 to the top of vessel 2. The top of the vaporizer 8 is connected through the pipe 16 to the middle portion of a distillation column 17 which is provided with a dephlegmator 18. The dephlegmator 18 is connected through a pipe 19 to a cooler 20 which latter is connected to the inlet pipe 15. The bottom of the column 17 is connected to a cooler 21 from which a pipe 22 may lead to a storage vessel (not shown). The air pipe of the siphon-pipe 7 may also protrude into the top of zone 2 above the place where the pipe 11 protrudes into the vessel, and pressure releasing valves may be arranged in pipe 12 and in pipe 7 between the bend and vaporizer 8. Pipe 4 may also be connected to pipe 5.

On working with the above described apparatus, the vessel, or zone, 1 is completely filled with acetic acid, which may contain about 0.2 per cent by weight of manganese acetate, and vessel, or zone, 2 also up to about the dotted line just below the mouth of pipe 11. Liquid acetaldehyde is introduced through pipe 15 or into the pipe 5', whereas about an equivalent quantity of oxygen or a corresponding amount of air or of a similar mixture containing oxygen, as for example air enriched in oxygen, is supplied through the pipe 13. By the heat evolved by the reaction the temperature in zone 1 soon rises to from about 50° to about 60° C. A considerable portion of the acetic acid contained, and moving upwards, in the vessel 1 is continuously run through the thermo-siphon cooler 6, in order to maintain the said temperature in the vessel 1, the degree of cooling depending on the external temperature. The top of the vessel 2 is continuously supplied with acetic acid carrying on the catalyst, so that the temperature is about 20° C. at the top and from about 30° to about 40° C. at the lower part of zone 2. Gaseous products, such as nitrogen and any residual aldehyde and carbon dioxide contained or formed in zone 1 pass through the nozzle plate 3, ascend through the down flowing acetic acid into zone 2 and then, if not absorbed by the acetic acid as is the case with the aldehyde, escape through the outlet 12. The acetic acid which has reached the bottom of zone 2 is led into zone 1 through the pipe 4 or, while dispensing with the lower portion of pipe 4, through the cooler 6, whereas a quantity of acetic acid corresponding to that formed by the oxidation of the aldehyde is continuously withdrawn from zone 1 by means of siphon-pipe 7. If the oxygen-containing gas be employed under increased pressure the pressure of the acetic acid is released in the pipe 7 before the acid is allowed to enter the vaporizer 8. In this case the siphon at the top of pipe 7 communicates with the top of zone 2, above the mouth of pipe 11. The crude acetic acid thus withdrawn is led into the vaporizer 8, which is heated, for example by the internal heating coils shown, in such a manner that the level of the liquid therein is always kept at the same height; part of the acid flows down at the bottom of said vaporizer through the cooler 9 where it is cooled to about 20° C. and then pumped, by means of the pump 10, through the pipe 11, into the top of zone 2. This cold acetic acid contains the whole of the catalyst withdrawn with the crude acid. The mixture of acetic acid and aldehyde vapours which escapes from the vaporizer 8 is led into about the middle of the still column 17 by means of the pipe 16, so that any unaltered aldehyde escapes in the vapour state through the dephlegmator 18 and is then condensed in the cooler 20, from where it is returned into the reaction vessel 1. Pure acetic acid is withdrawn through the cooler 21 at the bottom of the column.

What we claim is:—

1. In the continuous oxidation of acetaldehyde to acetic acid by reacting an oxygen containing gas with acetaldehyde in the presence of acetic acid while continuously supplying acetic acid carrying a catalyst comprising manganese acetate to the reaction mixture, and drawing off a quantity of acetic acid corresponding to that formed from the aldehyde, the step which comprises carrying out the oxidation in a vertical, coherent column of acetic acid while introducing the oxygen containing gas and liquid acetaldehyde into the lowest region of said coherent column and supplying cold acetic acid free from acetaldehyde and carrying the catalyst to the uppermost region of said coherent column in a quantity sufficient to superimpose a column thereof to the aforesaid column.

2. In the continuous oxidation of acetaldehyde to acetic acid by reacting an oxygen containing gas with acetaldehyde in the presence of acetic acid while continuously supplying acetic acid carrying a catalyst comprising manganese acetate to the reaction mixture, and drawing off a quantity of acetic acid corresponding to that formed from the aldehyde, the step which comprises carrying out the oxidation in a vertical, coherent column of acetic acid, while introducing the oxygen containing gas and liquid acetaldehyde into the lowest zone of said coherent column and supplying to the uppermost zone of said column, in a quantity sufficient to superimpose a column thereof to the aforesaid column, cold acetic acid free from acetaldehyde, carrying the catalyst and obtained by continuously withdrawing, from the lowest zone of the column, a quantity of acetic acid corresponding to the amount of aldehyde which is continuously introduced, subjecting the acid withdrawn to partial distillation until the vapours are free from aldehyde, and cooling the residual acid.

3. In the continuous oxidation of acetaldehyde to acetic acid by reacting an oxygen containing gas with acetaldehyde in the presence of acetic acid while continuously supplying acetic acid carrying a catalyst comprising manganese acetate to the reaction mixture, and drawing off a quantity of acetic acid corresponding to that formed from the aldehyde, the step which comprises carrying out the oxidation in a vertical coherent column of acetic acid, while introducing the oxygen containing gas and liquid acetaldehyde into the lowest zone of said coherent column, the temperature of which zone being regulated by continuously withdrawing a portion of the liquid reaction mixture from the upper region of said zone, externally cooling said portion and returning it into the lower region of said zone, and supplying cold acetic acid free from acetaldehyde to the uppermost zone of said coherent column in a quantity sufficient to superimpose a column thereof to the aforesaid column.

4. In the continuous oxidation of acetaldehyde to acetic acid by reacting an oxygen containing gas with acetaldehyde in the presence of acetic acid while continuously supplying acetic acid carrying a catalyst comprising manganese acetate to the reaction mixture, and drawing off a quantity of acetic acid corresponding to that formed from the aldehyde, the step which comprises carrying out the oxidation in a vertical coherent column of acetic acid, while introducing the oxygen containing gas and liquid acetaldehyde into the lowest zone of said coherent column, the temperature of which zone being regulated by continuously withdrawing a portion of the liquid reaction mixture from the upper region of said zone, externally cooling said portion and returning it into the lower region of said zone, supplying cold acetic acid free from acetaldehyde to the uppermost zone of said coherent column in a quantity sufficient to superimpose a column thereof to the aforesaid column, withdrawing acetic acid from the lowest region of said superimposed column and supplying it to the lowest region of the whole column.

5. In the continuous oxidation of acetaldehyde to acetic acid by reacting an oxygen containing gas with acetaldehyde in the presence of acetic acid while continuously supplying acetic acid carrying a catalyst comprising manganese acetate to the reaction mixture, and drawing off a quantity of acetic acid corresponding to that formed from the aldehyde, the step which comprises carrying out the oxidation in a vertical coherent column of acetic acid, while introducing the oxygen containing gas and liquid acetaldehyde into the lower region of the lowest zone of said column, the temperature of said lowest zone being regulated by continuously withdrawing a portion of acetic acid from the upper region of said zone, externally cooling said portion and returning it into the lower region of said lowest zone, supplying to the uppermost zone of said coherent column in a quantity sufficient to superimpose a column thereof to the aforesaid column, cold acetic acid, free from aldehyde and carrying the catalyst, and obtained by continuously withdrawing from the lowest zone of the column a quantity of acetic acid corresponding to the amount of aldehyde which is continuously introduced, subjecting the acid withdrawn to partial distillation until the vapours are free from aldehyde and cooling the residual acid, and supplying acetic acid withdrawn from the lowest region of said superimposed column to the lowest region of said lowest zone of the whole column.

6. An apparatus for carrying out the continuous oxidation of acetaldehyde to acetic acid, comprising, in combination, a tower-shaped reaction vessel, means capable of restricting the cross-section in the upper half of said vessel at least near the middle of said vessel, at least two pipe inlets at about the bottom of said vessel, a thermosiphon cooler connected to about the upper region of the lower zone, formed in said vessel by said restricting means, and to about the bottom of said vessel, a pipe connecting the lower region of the upper zone, formed in said vessel by said restricting means, to about the bottom of said vessel, an inlet pipe protruding into the top of said vessel, an outlet pipe connected to the top of said vessel and a siphon pipe, which is connected to the upper region of said lower zone and the bend of which is slightly below the mouth of said inlet pipe protruding into the top of said vessel.

7. An apparatus for carrying out the continuous oxidation of acetaldehyde to acetic acid, comprising, in combination, a tower-shaped reaction vessel, means capable of restricting the cross-section in the upper half of said vessel at least near the middle of said vessel, at least two pipe inlets at about the bottom of said vessel, a thermosiphon cooler connected to about the upper region of the lower zone, formed in said vessel by said restricting means, and to about the bottom of said vessel, a pipe connecting the lower region of the upper zone, formed in said vessel by said restricting means, to a thermo-siphon cooler, an inlet pipe protruding into the top of said vessel, an outlet pipe connected to the top of said vessel and a siphon pipe, which is connected to the upper region of said lower zone and the bend of which is slightly below the mouth of said inlet pipe protruding into the top of said vessel.

8. An apparatus for carrying out the continuous oxidation of acetaldehyde to acetic acid, comprising, in combination, a tower-shaped reaction vessel, means capable of restricting the cross-section in the upper half of said vessel at least near the middle of said vessel, at least two pipe inlets at about the bottom of said vessel, a thermosiphon cooler connected to about the upper region of the lower zone, formed in said vessel by said restricting means, and to about the bottom of said vessel, a pipe connecting the lower region of the upper zone, formed in said vessel by said restricting means, to said thermo-siphon cooler, an inlet pipe protruding into the top of said vessel, an outlet pipe connected to the top of said vessel and a siphon pipe, which is connected to the upper region of said lower zone and the bend of which is slightly below the mouth of said inlet pipe protruding into the top of said vessel, a vaporizer connected to said siphon pipe, a distillation column connected to the top of said vaporizer, a cooler arranged at the bottom of said vaporizer, and a pipe connecting said cooler with said inlet pipe protruding into the top of said vessel.

MARTIN MUELLER-CUNRADI.
KURT PIEROH.
HELLMUT GIEHNE.